United States Patent
Lv et al.

(10) Patent No.: US 12,537,959 B2
(45) Date of Patent: Jan. 27, 2026

(54) INTER-FRAME PREDICTION METHOD AND TERMINAL

(71) Applicant: VIVO MOBILE COMMUNICATION CO., LTD., Guangdong (CN)

(72) Inventors: Zhuoyi Lv, Guangdong (CN); Chuan Zhou, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 18/748,006

(22) Filed: Jun. 19, 2024

(65) Prior Publication Data

US 2024/0340428 A1 Oct. 10, 2024

Related U.S. Application Data

(63) Continuation of application No. PCT/CN2022/138759, filed on Dec. 13, 2022.

(30) Foreign Application Priority Data

Dec. 20, 2021 (CN) .......................... 202111566761.X
Mar. 10, 2022 (CN) .......................... 202210233750.8

(51) Int. Cl.
 *H04N 19/00* (2014.01)
 *H04N 19/137* (2014.01)
 (Continued)

(52) U.S. Cl.
 CPC ......... *H04N 19/137* (2014.11); *H04N 19/159* (2014.11); *H04N 19/176* (2014.11)

(58) Field of Classification Search
 CPC ................................................... H04N 19/00
 See application file for complete search history.

(56) References Cited

U.S. PATENT DOCUMENTS

2019/0045183 A1 2/2019 Chen et al.
2019/0373252 A1* 12/2019 Moon ................. H04N 19/117
(Continued)

FOREIGN PATENT DOCUMENTS

JP 2018530221 A 10/2018
JP 2020145486 A 9/2020
(Continued)

OTHER PUBLICATIONS

First Office Action for Japanese Application No. 2024-535913, dated Jul. 25, 2025, 8 Pages (including English machine translation).
(Continued)

*Primary Examiner* — Maryam A Nasri
(74) *Attorney, Agent, or Firm* — BROOKS KUSHMAN P.C.

(57) ABSTRACT

An inter-frame prediction method and a terminal and pertains to the field of video encoding and decoding technologies. The inter-frame prediction method according to embodiments of this application includes: obtaining first motion information of a first block and second motion information of a second block; determining first and second prediction values corresponding to each pixel point in a first pixel region associated with the first block; and determining a target prediction value corresponding to each pixel point in a second pixel region of the first block based on target information; where the first block is a block to be encoded, and the second block is an encoded block; or the first block is a block to be decoded, and the second block is a decoded block.

20 Claims, 6 Drawing Sheets

(51) Int. Cl.
 *H04N 19/159* (2014.01)
 *H04N 19/176* (2014.01)

(56) References Cited

U.S. PATENT DOCUMENTS

| | | |
|---|---|---|
| 2020/0021845 A1 | 1/2020 | Lin et al. |
| 2022/0030242 A1 | 1/2022 | Toma et al. |
| 2025/0039364 A1* | 1/2025 | Wang .................. H04N 19/593 |

FOREIGN PATENT DOCUMENTS

| | | |
|---|---|---|
| WO | 2019153861 A1 | 8/2019 |
| WO | 2020213677 A1 | 10/2020 |

OTHER PUBLICATIONS

Extended European Search Report for European Application No. 22909824.9-1207, dated Mar. 10, 2025, 12 Pages.

* cited by examiner

INTER-FRAME PREDICTION METHOD AND TERMINAL

CROSS-REFERENCES TO RELATED APPLICATIONS

This application is a continuation of International Application No. PCT/CN2022/138759 filed on Dec. 13, 2022, which claims priority to Chinese Patent Application No. 202111566761.X filed on Dec. 20, 2021, and to Chinese Patent Application No. 202210233750.8 filed on Mar. 10, 2022, which are incorporated herein by reference in their entireties.

TECHNICAL FIELD

This application pertains to the field of video encoding and decoding technologies and specifically relates to an inter-frame prediction method and a terminal.

BACKGROUND

Currently, in the process of video encoding and decoding, if the boundary of a block does not fit the contour of the block, the method of overlapped block motion compensation (OBMC) can be used for inter-frame prediction processing of the block to correct prediction values corresponding to boundary pixel points. In OBMC technology, prediction values obtained using motion information of the block and prediction values obtained using motion information of adjacent blocks are subjected to weighted processing, thereby correcting the prediction values of the boundary pixel points.

SUMMARY

Embodiments of this application provide an inter-frame prediction method and a terminal.

According to a first aspect, an inter-frame prediction method is provided, where the method includes:
  obtaining first motion information of a first block and second motion information of a second block, where the first block is adjacent to the second block;
  determining first and second prediction values corresponding to each pixel point in a first pixel region associated with the first block, where the first prediction value is determined based on the first motion information and position information of the first pixel region, and the second prediction value is determined based on the second motion information and position information of the first pixel region; and
  determining a target prediction value corresponding to each pixel point in a second pixel region of the first block based on target information, where the target information includes a first difference value and a second difference value, the first difference value being a difference value determined based on a reconstructed value and the first prediction value for each pixel point in the first pixel region, and the second difference value being a second difference value determined based on a reconstructed value and the second prediction value for each pixel point in the first pixel region; where
  the first block is a block to be encoded, and the second block is an encoded block; or the first block is a block to be decoded, and the second block is a decoded block.

According to a second aspect, an inter-frame prediction apparatus is provided, including:

an obtaining module configured to obtain first motion information of a first block and second motion information of a second block, where the first block is adjacent to the second block;
a first determination module configured to determine first and second prediction values corresponding to each pixel point in a first pixel region associated with the first block, where the first prediction value is determined based on the first motion information and position information of the first pixel region, and the second prediction value is determined based on the second motion information and position information of the first pixel region; and
a second determination module configured to determine a target prediction value corresponding to each pixel point in a second pixel region of the first block based on target information, where the target information includes a first difference value and a second difference value, the first difference value being a difference value determined based on a reconstructed value and the first prediction value for each pixel point in the first pixel region, and the second difference value being a second difference value determined based on a reconstructed value and the second prediction value for each pixel point in the first pixel region; where
the first block is a block to be encoded, and the second block is an encoded block; or the first block is a block to be decoded, and the second block is a decoded block.

According to a third aspect, a terminal is provided. The terminal includes a processor and a memory, where the memory stores a program or instructions capable of running on the processor, and when the program or instructions are executed by the processor, the steps of the method according to the first aspect are implemented.

According to a fourth aspect, a readable storage medium is provided, where the readable storage medium stores a program or instructions, and when the program or instructions are executed by a processor, the steps of the method according to the first aspect are implemented.

According to a fifth aspect, a chip is provided, where the chip includes a processor and a communication interface, the communication interface is coupled to the processor, and the processor is configured to run a program or instructions to implement the method according to the first aspect.

According to a sixth aspect, a computer program/program product is provided. The computer program/program product is stored in a storage medium. The computer program/program product is executed by at least one processor to implement the steps of the method according to the first aspect.

In the embodiments of this application, first motion information of a first block and second motion information of a second block are obtained; first and second prediction values corresponding to each pixel point in a first pixel region associated with the first block are determined; and a target prediction value corresponding to each pixel point in a second pixel region of the first block is determined based on target information. In the embodiments of this application, first and second prediction values are determined, where the first prediction value is determined based on the first motion information of the first block, and the second prediction value is determined based on the second motion information of the second block; and then, target prediction values for boundary pixel points are determined based on the target information. The target information includes first and second difference values, and a magnitude relationship between the first and second difference values can represent a motion difference between the first and second blocks, thus fully considering the motion difference between the first and second blocks in the process of correcting the prediction values for the boundary pixel points, improving the accuracy of the corrected prediction values for the boundary pixel points, and thereby improving the efficiency of video encoding and decoding.

DETAILED DESCRIPTION

Figure 1:
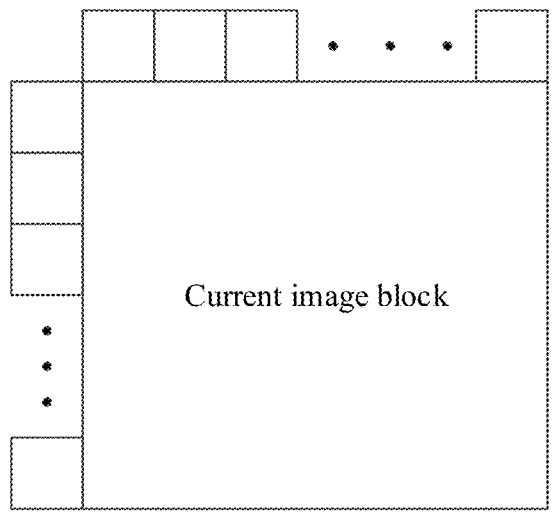
FIG. 1 is a first schematic diagram of an application scenario of an existing inter-frame prediction method.

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application fall within the protection scope of this application.

The terms "first", "second", and the like in the specification and claims of this application are used to distinguish between similar objects rather than to describe a specific order or sequence. It should be understood that the terms used in this way are interchangeable in appropriate circumstances such that the embodiments of this application can be implemented in other orders than the order illustrated or described herein. In addition, objects distinguished by "first" and "second" are generally of a same type, and the quantities of the objects are not limited. For example, there may be one or more first objects. In addition, in this specification and claims, "and/or" indicates at least one of the connected objects, and the character "/" generally indicates an "or" relationship between the contextually associated objects.

Attribute decoding apparatuses corresponding to the inter-frame prediction method in the embodiments of this application can all be terminals. The terminal can also be referred to as a terminal device or user equipment (UE). The terminal can be a mobile phone, tablet personal computer, laptop computer also known as a notebook computer, personal digital assistant (PDA), palmtop computer, netbook, ultra-mobile personal computer (UMPC), mobile internet device (MID), augmented reality (AR)/virtual reality (VR) device, robot, wearable device, vehicle user equipment (VUE), pedestrian user equipment (PUE), smart home device (wireless communication-enabled home devices such as refrigerators, televisions, washing machines, or furniture), gaming console, personal computer (PC), automated teller machine or self-service machine, or another terminal-side device. Wearable devices include smartwatches, smart bands, smart earphones, smart glasses, smart jewelry (smart bangles, smart bracelets, smart rings, smart necklaces, smart foot bangles, and smart anklets), smart wristbands, and smart clothing. It should be noted that the specific type of the terminal is not limited in the embodiments of this application.

For ease of understanding, the following describes some content included in the embodiments of this application:

In a case that a boundary of a block does not fit a contour of the current block, motion of boundary pixel points of the current block may be consistent with that of the current block or with an adjacent block. Prediction values of the boundary pixel points determined based on motion information of the current block are significantly different from real prediction values, thereby reducing the efficiency of video encoding and decoding. The current block mentioned above can be a block to be encoded, with the adjacent block being an encoded block, or the current block can be a block to be decoded, with the adjacent block being a decoded block.

Currently, OBMC technology can be used for correcting the prediction values of the boundary pixel points of the current block, so as to solve the above technical problem, where OBMC technology is an inter-frame prediction method. Below, OBMC technology is specifically elaborated:

In a first case, an inter-frame prediction mode of each pixel point of the current block is the same.

In this case, when the adjacent block is in inter-frame prediction mode, not in intra-frame block copy mode, and the motion mode of the adjacent block is inconsistent with the motion mode of the current block, motion information of the adjacent block is obtained. Referring to FIG. 1, the adjacent block can be a block adjacent to the top of the current block or a block adjacent to the left of the current block.

The motion mode of the adjacent block is determined to be inconsistent with the motion mode of the current block if any one of the following conditions is met:
1. A prediction direction of the adjacent block is different from a prediction direction of the current block.
2. The prediction direction of the adjacent block is the same as the prediction direction of the current block, but reference frames to which the prediction directions point are different.
3. The prediction direction of the adjacent block is the same as the prediction direction of the current block, the reference frames to which the prediction directions point are the same, but a motion vector of the adjacent block is different from a motion vector of the current block.

After the motion information of the adjacent block is obtained, a first prediction value is obtained based on the motion information of the current block, and a second prediction value is obtained based on the motion information of the adjacent block. The above first and second prediction values are used for correcting the prediction values of the boundary pixels of the current block.

Specifically, in a case that the current block is a luminance sub-block, the following formulas can be used for performing weighted sum processing on the first and second prediction values to obtain corrected prediction values of the boundary pixel points:

$$\text{NewPixel}(i,j)=(26\times \text{Pixel1}(i,j)+6\times \text{Pixel2}(i,j)+16)>>5$$

$$\text{NewPixel}(i,j)=(7\times \text{Pixel1}(i,j)+\text{Pixel2}(i,j)+4)>>3$$

$$\text{NewPixel}(i,j)=(15\times \text{Pixel1}(i,j)+\text{Pixel2}(i,j)+8)>>4$$

$$\text{NewPixel}(i,j)=(31\times \text{Pixel1}(i,j)+\text{Pixel2}(i,j)+16)>>5;$$
where i represents a column coordinate of the boundary pixel point in the current block, j represents a row coordinate of the boundary pixel point in the current block, Pixel represents the first prediction value of the boundary pixel point, Pixel2 represents the second prediction value of the boundary pixel point, and NewPixel represents the corrected prediction value of the boundary pixel point.

In a case that the current block is a chrominance sub-block, the following formula can be used for performing weighted sum processing on the first and second prediction values to obtain the corrected prediction values of the boundary pixel points:

$$\text{NewPixel}(i,j)=(26\times \text{Pixel1}(i,j)+6\times \text{Pixel2}(i,j)+16)>>5;$$
where NewPixel represents the corrected prediction value of the boundary pixel point.

It should be understood that the above formulas correspond to an application scenario where a pixel region of the boundary pixel points is 4 rows or 4 columns. In other application scenarios, there is no specific limitation on the pixel region of the boundary pixel points.

In a second case, the current block is an encoded block and the inter-frame prediction mode is affine mode, or the current block is a decoded block and the inter-frame prediction mode is motion vector correction mode.

Figure 2:
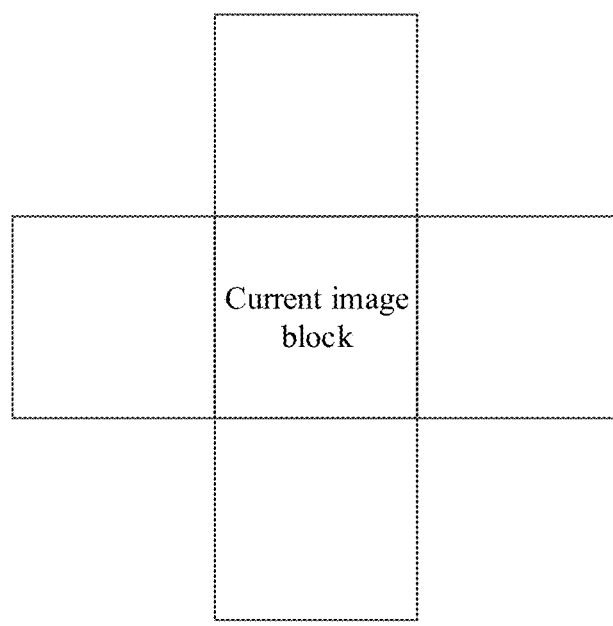
FIG. 2 is a second schematic diagram of an application scenario of an existing inter-frame prediction method.

In this case, motion information of the four adjacent blocks on the top, bottom, left, and right of the current block is obtained. Referring to FIG. 2, FIG. 2 shows a positional relationship between the adjacent blocks and the current block in the above cases.

The first prediction value is obtained based on the motion information of the current block; and the second prediction value is obtained based on the motion information of the adjacent block in a case that any one of the following conditions is met between the current block and the adjacent block.

1. The prediction direction of the adjacent block is different from the prediction direction of the current block.
2. The prediction direction of the adjacent block is the same as the prediction direction of the current block, but reference frames to which the prediction directions point are different.
3. The prediction direction of the adjacent block is the same as the prediction direction of the current block, the reference frames to which the prediction directions point are the same, but an absolute value of a difference between a motion vector of the adjacent block and a motion vector of the current block is greater than a preset threshold.

The above first and second prediction values are used to correct the prediction values of the boundary pixels of the current block. Specifically, the following formula can be used for performing weighted sum processing on the first and second prediction values to obtain the corrected prediction values of the boundary pixel points:

$$\text{rem\_}w(i,j)=(32-w(i)-w(\text{width}-i)-w(j)-w(\text{height}-j))$$

$$\text{subNewPixel}(i,j)=(\text{subPixel2}_L(i,j)\times w(i)+\text{subPixel2}_R(i,j)\times w(\text{width}-1-i)+\text{subPixel2}_T(i,j)\times w(j)+\text{subPixel2}_B(i,j)\times w(\text{height}-1-j)+\text{subPixel1}\times \text{rem\_}w(i,j)+16)>>5;$$ where i represents the column coordinate of the boundary pixel point in the current block, j represents the row coordinate of the boundary pixel point in the current block, subNewPixel represents the corrected prediction value of the boundary pixel point, subPixel2L, subPixel2R, subPixel2T, and subPixel2B represent the second prediction values determined based on the motion information of the adjacent block, width represents the number of columns of the adjacent block, height represents the number of rows of the adjacent block, and w represents a preset weight combination; where a weight combination corresponding to a luminance block is different from a weight combination corresponding to a chrominance block.

It should be understood that the above formulas correspond to an application scenario where the pixel region of the boundary pixel points is 4 rows or 4 columns. In other application scenarios, there is no specific limitation on the pixel region of the boundary pixel points.

In the process of using OBMC technology to correct the prediction values of boundary pixel points, a difference between the motion mode of the current block and the motion mode of the adjacent block is not considered, which leads to the corrected prediction values of the boundary pixel points being inaccurate, thereby reducing the efficiency of video encoding and decoding.

Based on the above situation, how the accuracy of the corrected prediction values of the boundary pixel points is improved so as to improve the efficiency of video encoding and decoding is a technical problem to be solved.

In order to solve the possible technical problems mentioned above, an embodiment of this application provides an inter-frame prediction method. The following is a detailed explanation of the inter-frame prediction method provided by some embodiments and their application scenarios in conjunction with the accompanying drawings.

Figure 3:
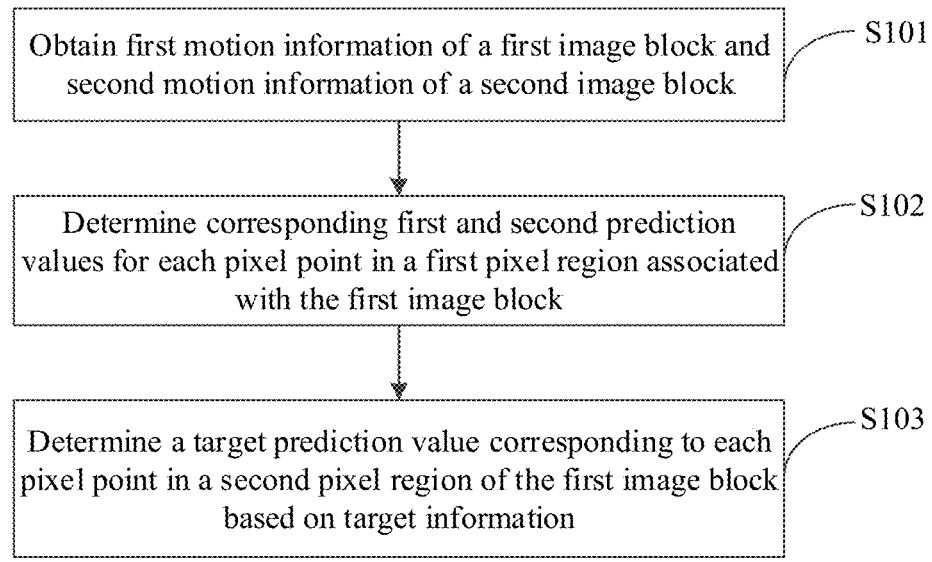
FIG. 3 is a flowchart of an inter-frame prediction method according to an embodiment of this application.

Referring to FIG. 3, FIG. 3 is a flowchart of an inter-frame prediction method provided by this application. The inter-frame prediction method provided in an embodiment includes the following steps:

S101. Obtain first motion information of a first block and second motion information of a second block.

The first block is a block to be encoded, and the second block is an encoded block adjacent to the first block; or the first block is a block to be decoded, and the second block is a decoded block adjacent to the first block. The first block is in inter-frame prediction mode, and the first and second blocks meet any one of the following conditions:

1. A prediction direction of the first block is different from a prediction direction of the second block.

2. The prediction direction of the first block is the same as the prediction direction of the second block, but reference frames to which the prediction directions point are different.
3. The prediction direction of the first block is the same as the prediction direction of the second block, the reference frames to which the prediction directions point are the same, but a motion vector of the first block is different from a motion vector of the second block.

In this step, the first motion information of the first block and the second motion information of the second block are obtained in a case that the first and second blocks meet any one of the above conditions.

S102. Determine first and second prediction values corresponding to each pixel point in a first pixel region associated with the first block.

The first pixel region is adjacent to the first block, and the first pixel region may be part of the pixel region of the second block. For example, in a case that the second block is a block adjacent to the top of the first block, and the first pixel region is a pixel region to the top of the first block, the first pixel region is part of the pixel region of the second block. The first pixel region may not be part of the pixel region of the second block.

It should be understood that motion information includes prediction direction, reference frame information, and motion vector. In this step, a first reference pixel point can be determined based on the first motion information, where the first reference pixel point is a reconstructed pixel point in the first reference frame located at a same position as the first pixel region; and then, based on the first reference pixel point, a reconstructed value of a pixel point in the first reference frame to which a first motion vector points is determined as a first prediction value. A second reference pixel point is determined based on the second motion information, where the second reference pixel point is a reconstructed pixel point in a second reference frame located at a same position as the first pixel region; and then, based on the second reference pixel point, a reconstructed value of a pixel point in the second reference frame to which a second motion vector points is determined as a second prediction value.

S103. Determine a target prediction value corresponding to each pixel point in a second pixel region of the first block based on target information.

The target information includes a first difference value and a second difference value, where the first difference value is a difference value determined based on a reconstructed value and the first prediction value for each pixel point in the first pixel region, and the second difference value is a second difference value determined based on a reconstructed value and the second prediction value for each pixel point in the first pixel region. Optionally, the first difference value can be a sum of absolute values of differences between the first prediction value and reconstructed values for all pixel points, and the second difference value can be a sum of absolute values of differences between the second prediction value and reconstructed values for all pixel points. The first difference value is used to represent a motion mode of the first block, and the second difference value is used to represent a motion mode of the second block.

Figure 4:
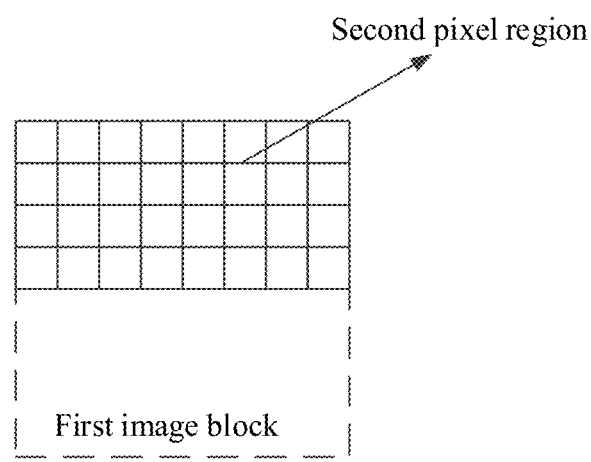
FIG. 4 is a first schematic diagram of an application scenario of an inter-frame prediction method according to an embodiment of this application.
Figure 5:
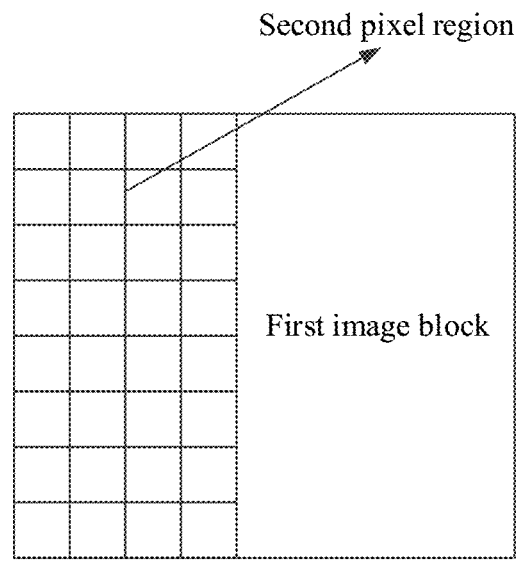
FIG. 5 is a second schematic diagram of an application scenario of an inter-frame prediction method according to an embodiment of this application.

The second pixel region is part of the pixel region of the first block, and each pixel point in the second pixel region is also referred to as a boundary pixel point. For ease of understanding, referring to FIGS. 4 and 5, FIG. 4 shows a position of the second pixel region in a case that the first pixel region is to the top of the first block, and FIG. 5 shows a position of the second pixel region in a case that the first pixel region is to the left of the first block. To be specific, in an optional implementation, the first pixel region in the second block is adjacent to the second pixel region in the first block.

In this step, the target prediction value for each boundary pixel point can be determined using the first and second difference values corresponding to the first pixel region. For specific technical solutions, refer to subsequent embodiments. It should be understood that the target prediction value is a corrected prediction value of the boundary pixel point.

Figure 6:
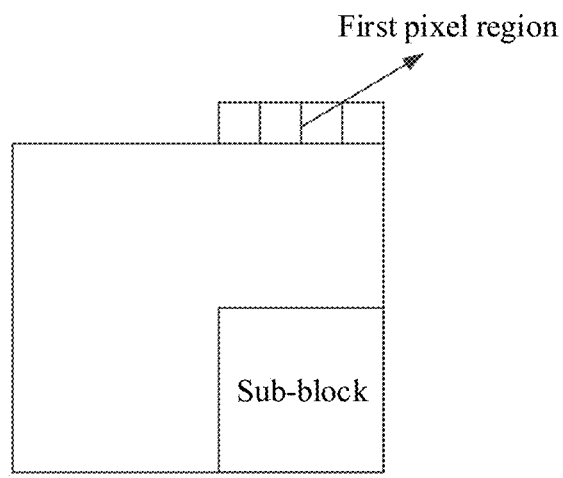
FIG. 6 is a third schematic diagram of an application scenario of an inter-frame prediction method according to an embodiment of this application.
Figure 7:
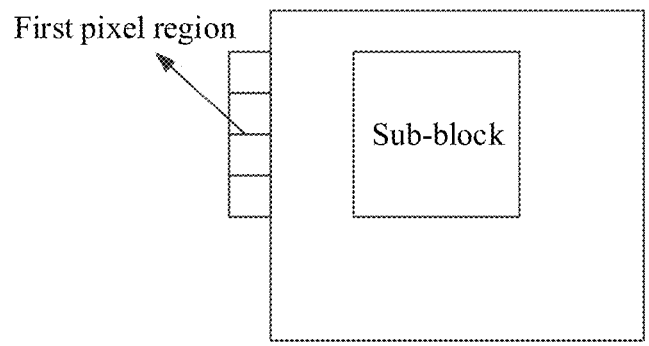
FIG. 7 is a fourth schematic diagram of an application scenario of an inter-frame prediction method according to an embodiment of this application.

In other embodiments, the inter-frame prediction method provided in this embodiment of this application can also be used to generate prediction values of the boundary pixel points of each sub-block within an encoded or decoded block. In this implementation, referring to FIG. 6, the first pixel region consists of reconstructed pixels adjacent to the top of an encoded block corresponding to a column where the sub-block is located; or referring to FIG. 7, the first pixel region consists of reconstructed pixels adjacent to the left of an encoded block corresponding to a row where the sub-block is located.

The inter-frame prediction method according to this embodiment of this application has higher encoding performance for video than the traditional inter-frame prediction methods. For ease of understanding the technical effects brought by this application, refer to Table 1.

TABLE 1

| | | Y-Channel BD-Rate | U-Channel BD-Rate | V-Channel BD-Rate |
|---|---|---|---|---|
| Test Category C | Test Sequence 1 | −0.08% | −0.21% | −0.11% |
| | Test Sequence 2 | −0.30% | −0.46% | −0.23% |
| | Test Sequence 3 | −0.05% | 0.16% | 0.05% |
| | Test Sequence 4 | −0.21% | −0.42% | −0.21% |
| Test Category D | Test Sequence 5 | −0.13% | 0.43% | −0.11% |
| | Test Sequence 6 | −0.12% | −0.36% | 0.04% |
| | Test Sequence 7 | −0.10% | −0.05% | 0.14% |
| | Test Sequence 8 | −0.34% | −0.67% | −0.50% |
| Average for Test Category C | | −0.16% | −0.23% | −0.13% |
| Average for Test Category D | | −0.17% | −0.16% | −0.11% |

The test sequences in Table 1 are encoded using the inter-frame prediction method provided in this embodiment of this application and compared with those encoded using traditional inter-frame prediction methods. The Y-channel BD-Rate, U-channel BD-Rate, and V-channel BD-Rate are parameters used for evaluating encoding performance, with a negative BD-Rate indicating higher encoding performance, and higher absolute value of the BD-Rate leads to greater gain brought by the encoding performance. It can be seen from Table 1 that the inter-frame prediction method provided in this embodiment of this application has higher encoding performance for video than traditional inter-frame prediction methods.

In the embodiments of this application, first motion information of a first block and second motion information of a second block are obtained; first and second prediction values corresponding to each pixel point in a first pixel region associated with the first block are determined; and a target prediction value corresponding to each pixel point in a second pixel region of the first block is determined based on target information. In this embodiment of this application, first and second prediction values are determined, where the first prediction value is determined based on the first motion information of the first block, and the second prediction value is determined based on the second motion information of the second block; and then, target prediction values for boundary pixel points are determined based on the target information. The target information includes first and second difference values, and a magnitude relationship between the first and second difference values can represent a motion difference between the first and second blocks, thus fully considering the motion difference between the first and second blocks in the process of correcting the prediction values for the boundary pixel points, improving the accuracy of the corrected prediction values for the boundary pixel points, and thereby improving the efficiency of video encoding and decoding.

Optionally, the target information further includes a third difference value, where the third difference value is a difference value, corresponding to the first pixel region, determined based on the first and second prediction values. For specific technical solutions on how the third difference value is determined, refer to subsequent embodiments.

Optionally, the first pixel region satisfies at least one of the following:
the first pixel region is a pixel region encoded or decoded consisting of M1 rows and N1 columns adjacent to the top of the first block; and
the first pixel region is a pixel region encoded or decoded consisting of M2 rows and N2 columns adjacent to the left of the first block; where
M1, M2, N1, and N2 are all positive integers.

Figure 8:
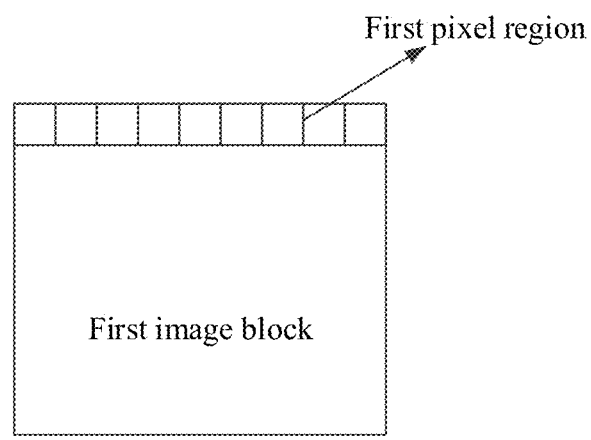
FIG. 8 is a fifth schematic diagram of an application scenario of an inter-frame prediction method according to an embodiment of this application.

In an optional implementation, the first pixel region is a pixel region encoded or decoded consisting of M1 rows and N1 columns adjacent to the top of the first block. For ease of understanding, refer to FIG. 8. In the scenario shown in FIG. 8, the first pixel region is a pixel region encoded or decoded consisting of 1 row and 8 columns adjacent to the top of the first block.

Figure 9:
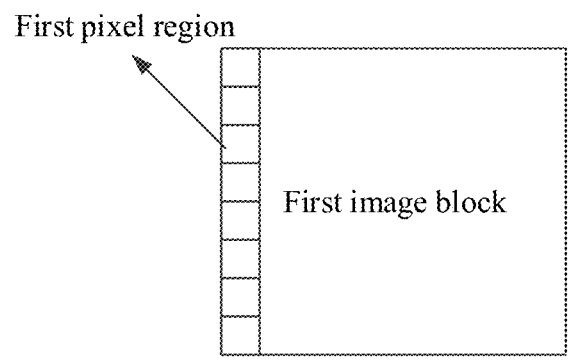
FIG. 9 is a sixth schematic diagram of an application scenario of an inter-frame prediction method according to an embodiment of this application.

In another optional implementation, the first pixel region is a pixel region encoded or decoded consisting of M2 rows and N2 columns adjacent to the left of the first block. For ease of understanding, refer to FIG. 9. In the scenario shown in FIG. 9, the first pixel region is a pixel region encoded or decoded consisting of 8 rows and 1 column adjacent to the left of the first block.

In another optional implementation, the first pixel region can be an encoded or decoded pixel region consisting of some pixel points adjacent to the top of the first block or an encoded or decoded pixel region consisting of some pixel points adjacent to the left of the first block. In this case, the first pixel region is in an "L" shape.

In this embodiment, the first pixel region may be a part of the pixel region adjacent to the top of the first block, or a part of the pixel region adjacent to the left of the first block, or both the part of the pixel region adjacent to the top and the part of the pixel region adjacent to the left of the first block. Therefore, this has motion differences between the first block and adjacent blocks fully considered, improving the accuracy of the corrected prediction values of the boundary pixel points.

Optionally, the determining a target prediction value corresponding to each pixel point in a second pixel region of the first block based on target information includes:
determining a target weight value combination based on the target information; and
performing weighted sum processing on the third and fourth prediction values corresponding to each pixel point in the second pixel region based on the target weight value combination to obtain the target prediction value corresponding to each pixel point in the second pixel region.

The target weight value combination includes at least one weight group, the weight group includes a first weight value and a second weight value, the first weight value corresponds to a third prediction value for each pixel point in the second pixel region, the second weight value corresponds to a fourth prediction value for each pixel point in the second pixel region, the third prediction value is determined based on the first motion information, and the fourth prediction value is determined based on the second motion information.

Specifically, motion information includes prediction direction, reference frame information, and motion vector. The first reference frame can be determined based on the first prediction direction and the first reference frame information in the first motion information, where the first reference frame is an encoded frame or decoded frame, and a position to which the first motion vector in the first reference frame points is determined, and a reconstructed value of a pixel point at that position is determined as the third prediction value. Based on the second prediction direction and second reference frame information in the second motion information, the second reference frame can be determined, where the second reference frame is an encoded frame or decoded frame, and a position to which the second motion vector in the second reference frame points is determined, and a reconstructed value of a pixel point at that position is determined as the fourth prediction value.

In this embodiment, after the target weight value combination is determined the following formula can be used for performing weighted sum processing on the third and fourth prediction values corresponding to each pixel point in the second pixel region to obtain the target prediction value corresponding to each pixel point in the second pixel region:

shift=$\log_2(w1_1+w1_2)$ offset=$(w1_1+w1_2)/2$

Pixel$(i,j)$=$(w1_1 \times$Pixel3$(i,j)+w1_2\times$Pixel4$(i,j)+$offset$)>>$shift; where Pixel represents the target prediction value, w11 represents the first weight value, w12 represents the second weight value, Pixel3 represents the third prediction value, and Pixel4 represents the fourth prediction value.

Below, the method of determining the target weight value combination is specifically elaborated:

Optionally, the determining a target weight value combination based on the target information includes:
determining a first weight value combination as the target weight value combination in a case that the first difference value is greater than the second difference value and/or the third difference value;
in a case that the third difference value is less than the first difference value and the second difference value, determining a second weight value combination as the target weight value combination, or determining the target weight value combination based on the first difference value and the second difference value;
determining the third prediction value for each pixel point in the second pixel region as the target prediction value in a case that the first difference value is less than the second difference value and the third difference value; or determining the fourth prediction value for each pixel point in the second pixel region as the target prediction value in a case that the second difference value is less than the third difference value and the first difference value.

It should be understood that the target weight value combination is related to the magnitude relationship between the first difference value, the second difference value, and the third difference value.

In an optional embodiment, in a case that the first difference value is greater than the second difference value and/or the third difference value, that is, the first difference value is not the smallest, a preset first weight value combination can be determined as the target weight value combination.

In an optional embodiment, in a case that the third difference value is less than the first difference value and the second difference value, that is, the third difference value is the smallest, a preset second weight value combination can be determined as the target weight value combination.

It should be understood that this embodiment does not limit the magnitude relationship between the weight values included in the first weight value combination and the second weight value combination.

In a case that the first block is a luminance block, and the second pixel region includes 4 rows with each row including 8 pixels, the first weight value combination can be the same as a fifth weight value combination in the following. In a case that the first block is a chrominance block, and the second pixel region consists of 1 row including 4 pixels, the first weight value combination can be the same as a sixth weight value combination in the following.

It should be understood that the above is only for the need to elaborate the technical solution in detail, and the first weight value combination is given as an example, and the numerical values included in the first weight value combination are not limited herein.

In a case that the first block is a luminance block, and the second pixel region includes 2 rows with each row including 8 pixels, the second weight value combination can be the same as a seventh weight value combination in the following. In a case that the first block is a chrominance block, and the second pixel region consists of 1 row including 4 pixels, the second weight value combination can be the same as an eighth weight value combination in the following.

It should be understood that the above is only for the need to elaborate the technical solution in detail, and the second weight value combination is given as an example, and the numerical values included in the second weight value combination are not limited herein.

In an optional embodiment, in a case that the first difference value is less than the second difference value and the third difference value, that is, the first difference value is the smallest, indicating that the motion mode of the boundary pixel points tends more toward the first block, the third prediction value for the boundary pixel points is determined as the target prediction value.

In an optional embodiment, in a case that the second difference value is less than the first difference value and the third difference value, that is, the second difference value is the smallest, indicating that the motion mode of the boundary pixel points tends more toward the second block, the fourth prediction value for the boundary pixel points is determined as the target prediction value.

In this embodiment, different weight value combinations are determined based on the magnitude relationship between the first difference value, the second difference value, and the third difference value, where the above magnitude relationship can reflect motion differences between the first and second blocks. Therefore, this has the motion differences between the first and second blocks fully considered in the process of using the weight value combination to correct the prediction values of the boundary pixel points, improving the accuracy of the corrected prediction values of the boundary pixel points, and thereby improving the efficiency of video encoding and decoding.

Optionally, the determining the target weight value combination based on the first difference value and the second difference value includes:

determining a third weight value combination as the target weight value combination in a case that the third difference value is less than the first difference value and the second difference value and that the first difference value is less than the second difference value; and determining a fourth weight value combination as the target weight value combination in a case that the third difference value is less than the first difference value and the second difference value and that the first difference value is greater than or equal to the second difference value.

In this embodiment, in a case that the third difference value is the smallest, the target weight value combination can be further determined based on the magnitude relationship of the first difference value and the second difference value.

In an optional implementation, in a case that the third difference value is less than the first difference value and the second difference value, and the first difference value is less than the second difference value, that is, the third difference value is the smallest and the second difference value is the largest, the preset third weight value combination can be determined as the target weight value combination.

In another optional implementation, in a case that the third difference value is less than the first difference value and the second difference value, and the first difference value is greater than or equal to the second difference value, the preset fourth weight value combination can be determined as the target weight value combination.

In a case that the first block is a luminance block, and the second pixel region includes 2 rows, with each row including 8 pixels, the third weight value combination can be the same as a twelfth weight value combination in the following. In a case that the first block is a chrominance block, and the second pixel region consists of 1 row including 4 pixels, the third weight value combination can be the same as a thirteenth weight value combination in the following.

It should be understood that the above is only for the need to elaborate the technical solution in detail, and the third weight value combination is given as an example, and the numerical values included in the third weight value combination are not limited herein.

In a case that the first block is a luminance block, and the second pixel region includes 2 rows, with each row including 8 pixels, the fourth weight value combination can be the same as a fourteenth weight value combination in the following. In a case that the first block is a chrominance block, and the second pixel region consists of 1 row including 4 pixels, the fourth weight value combination can be the same as a fifteenth weight value combination in the following.

It should be understood that the above is only for the need to elaborate the technical solution in detail, and the fourth weight value combination is given as an example, and the numerical values included in the fourth weight value combination are not limited herein.

It should be understood that this embodiment does not limit the magnitude relationship between the weight values included in the third weight value combination and the fourth weight value combination.

In this embodiment, different weight value combinations are determined based on the magnitude relationship between the first difference value, the second difference value, and the third difference value, where the above magnitude relationship can reflect motion differences between the first and second blocks. Therefore, this has the motion differences between the first and second blocks fully considered in the process of using the weight value combination to correct the prediction values of the boundary pixel points, improving the accuracy of the corrected prediction values of the boundary pixel points, and thereby improving the efficiency of video encoding and decoding.

Optionally, the target information further includes a type of the first block, and the determining a target weight value combination based on the target information includes:

determining a fifth weight value combination as the target weight value combination in a case that the type of the first block is a luminance block and that the first difference value is greater than the second difference value and/or the third difference value;

determining a sixth weight value combination as the target weight value combination in a case that the type of the first block is a chrominance block and that the first difference value is greater than the second difference value and/or the third difference value;

determining a seventh weight value combination as the target weight value combination in a case that the type of the first block is a luminance block and that the third difference value is less than the first difference value and the second difference value; and determining an eighth weight value combination as the target weight value combination in a case that the type of the first block is a chrominance block and that the third difference value is less than the first difference value and the second difference value.

In this embodiment, different target weight value combinations can also be set based on the type of the first block.

In an optional implementation, in a case that the type of the first block is a luminance block, and the first difference value is not the smallest, a preset fifth weight value combination can be determined as the target weight value combination. Here, taking the video sequence picture format of 4:2:0 as an example, an area of the chrominance block is one-fourth of an area of the luminance block; taking the size of the first picture luminance block as 8×8 as an example, the size of the first picture chrominance block is 4×4.

For example, the second pixel region is adjacent to the top boundary of the first block. In a case that the second pixel region of the first picture luminance block includes 4 rows, with each row including 8 pixels, the above fifth weight value combination can be:

weight values of the first row of pixel points: $w5_{1,0}=26$, $w5_{2,0}=6$ weight values of the second row of pixel points: $w5_{1,1}=7$, $w5_{2,1}=1$ weight values of the third row of pixel points: $w5_{1,2}=15$, $w5_{2,2}=1$ weight values of the fourth row of pixel points: $w5_{1,3}=31$, $w5_{2,3}=1$ It should be understood that the above is only for the need to elaborate the technical solution in detail, and the fifth weight value combination is given as an example, and the numerical values included in the fifth weight value combination are not limited herein.

In a case that the type of the first block is a chrominance block, and the first difference value is not the smallest, a preset sixth weight value combination can be determined as the target weight value combination.

For example, in a case that the second pixel region of the first picture chrominance block consists of 1 row including 4 pixels, the above sixth weight value combination can be:
$w6_{1,0}=26$, $w6_{2,0}=6$ It should be understood that the above is only for the need to elaborate the technical solution in detail, and the sixth weight value combination is given as an example, and the numerical values included in the sixth weight value combination are not limited herein.

It should be understood that the number of weight values in the weight value combination corresponding to the chrominance block can be less than, greater than, or equal to the number of weight values in the weight value combination corresponding to the luminance block, which is not specifically limited here. The weight values in the weight value combination corresponding to the chrominance block can be part of the weight values in the weight value combination corresponding to the luminance block, or other numerical values, which are not specifically limited here.

In another optional implementation, in a case that the type of the first block is a luminance block, and the third difference value is the smallest, a preset seventh weight value combination can be determined as the target weight value combination.

For example, in a case that the second pixel region of the first picture luminance block includes 2 rows, with each row including 8 pixels, the above seventh weight value combination can be:

weight values of the first row of pixel points: $w7_{1,0}=15$, $w7_{2,0}=1$ weight values of the second row of pixel points: $w7_{1,1}=31$, $w7_{2,1}=1$ It should be understood that the above is only for the need to elaborate the technical solution in detail, and the seventh weight value combination is given as an example, and the numerical values included in the seventh weight value combination are not limited herein.

In a case that the type of the first block is a chrominance block, and the third difference value is the smallest, a preset eighth weight value combination can be determined as the target weight value combination.

For example, in a case that the second pixel region of the first picture chrominance block consists of 1 row including 4 pixels, the above eighth weight value combination can be:
$w8_{1,0}=31$, $w8_{2,0}=1$ It should be understood that the above is only for the need to elaborate the technical solution in detail, and the eighth weight value combination is given as an example, and the numerical values included in the eighth weight value combination are not limited herein.

In other embodiments, in a case that the type of the first block is a luminance block, the third difference value is the smallest, and the first difference value is less than the second difference value, a preset twelfth weight value combination can be determined as the target weight value combination.

For example, in a case that the second pixel region of the first picture luminance block includes 2 rows, with each row including 8 pixels, the above twelfth weight value combination can be:

weight values of the first row of pixel points: $w12_{1,0}=15$, $w12_{2,0}=1$ weight values of the second row of pixel points: $w12_{1,1}=31$, $w12_{2,1}=1$ It should be understood that the above is only for the need to elaborate the technical solution in detail, and the twelfth weight value combination is given as an example, and the numerical values included in the twelfth weight value combination are not limited herein.

In a case that the type of the first block is a chrominance block, the third difference value is the smallest, and the first difference value is less than the second difference value, a preset thirteenth weight value combination can be determined as the target weight value combination.

For example, in a case that the second pixel region of the first picture chrominance block consists of 1 row including 4 pixels, the above thirteenth weight value combination can be:

$w13_{1,0}=31$, $w13_{2,0}=1$

It should be understood that the above is only for the need to elaborate the technical solution in detail, and the thirteenth weight value combination is given as an example, and the numerical values included in the thirteenth weight value combination are not limited herein.

In other embodiments, if the type of the first block is a luminance block, the third difference value is the smallest, and the first difference value is greater than or equal to the second difference value, a preset fourteenth weight value combination can be determined as the target weight value combination.

For example, in a case that second pixel region of the first picture luminance block includes 2 rows and 8 pixels per row, the above fourteenth weight value combination can be:

weight values of the first row of pixel points: $w14_{1,0}=7$, $w14_{2,0}=1$ weight values of the second row of pixel points: $w14_{1,1}=15$, $w14_{2,1}=1$ weight values of the third row of pixel points: $w14_{2,1}=31$, $w14_{2,2}=1$ It should be understood that the above is only for the need to elaborate the technical solution in detail, and the fourteenth weight value combination is given as an example, and the numerical values included in the fourteenth weight value combination are not limited herein.

In a case that the type of the first block is a chrominance block, the third difference value is the smallest, and the first difference value is greater than or equal to the second difference value, a preset fifteenth weight value combination can be determined as the target weight value combination.

For example, in a case that the second pixel region of the first picture chrominance block consists of 1 row including 4 pixels, the above fifteenth weight value combination can be:

$w15_{1,0}=15$, $w15_{2,0}=1$

It should be understood that the above is only for the need to elaborate the technical solution in detail, and the fifteenth weight value combination is given as an example, and the numerical values included in the fifteenth weight value combination are not limited herein.

In other embodiments, the target weight value combinations corresponding to different types of the first block can be the same, that is, the above fifth weight value combination is the same as the sixth weight value combination, and the above seventh weight value combination is the same as the eighth weight value combination.

In this embodiment, different weight value combinations are based on the magnitude relationship between the first difference value, the second difference value, and the third difference value, where the above magnitude relationship can reflect the motion differences between the first and second blocks. Therefore, this has the motion differences between the first and second blocks fully considered in the process of using the weight value combination to correct the prediction values of the boundary pixel points, improving the accuracy of the corrected prediction values of the boundary pixel points, and thereby improving the efficiency of video encoding and decoding.

Below, the technical solution for determining the third difference value corresponding to each pixel point in the first pixel region is specifically elaborated:

Optionally, the method further includes:

performing weighted sum processing on the first and second prediction values corresponding to each pixel point in the first pixel region to obtain a fifth prediction value for each pixel point; and determining the third difference value corresponding to the first pixel region based on the fifth prediction value for each pixel point and the reconstructed value corresponding to each pixel point.

In this embodiment, for a pixel point in the first pixel region, the following formulas can be used for performing weighted sum processing on the first and the second prediction values of that pixel point to obtain the fifth prediction value for that pixel point:

$$\text{shift} = \log_2(w1_1 + w1_2)$$

$$\text{offset} = (w1_1 + w1_2)/2$$

$$Pixel5(i,j) = (w1_1 \times Pixel1(i,j) + w1_2 \times Pixel2(i,j) + \text{offset}) \gg \text{shift}$$

Where Pixel5 represents the fifth prediction value, $w1_1$ and $w1_2$ represent the weight combinations, optionally, $w1_1$ is 26, and $w1_2$ is 6; Pixel1 represents the first prediction value, and Pixel2 represents the second prediction value.

After the fifth prediction value is obtained through calculation, the third difference value corresponding to the first pixel region is determined based on the fifth prediction value and the reconstructed value corresponding to each pixel point. For specific technical solutions, refer to subsequent embodiments.

Optionally, the determining the third difference value corresponding to the first pixel region based on the fifth prediction value for each pixel point and the reconstructed value corresponding to each pixel point includes:

determining a sum of target absolute values corresponding to all pixel points in the first pixel region as the third difference value; or determining an average of the target absolute values corresponding to all pixel points in the first pixel region as the third difference value.

In an optional implementation in this embodiment, for any pixel point in the first pixel region, an absolute value of a difference between the fifth prediction value and the reconstructed value of that pixel point is calculated, and the above absolute value is determined as a target absolute value corresponding to that pixel point; further, the sum of the target absolute values corresponding to all pixel points is determined as the third difference value corresponding to the first pixel region.

In another optional implementation, an average of the target absolute values corresponding to all pixel points in the first pixel region is determined as the third difference value corresponding to the first pixel region.

In this embodiment of this application, the target weight value combination can also be determined based solely on the first difference value and the second difference value:

Optionally, the determining a target weight value combination based on the target information includes:
- determining the third prediction value for each pixel point in the second pixel region as the target prediction value in a case that the first difference value is less than the second difference value; and
- determining a ninth weight value combination as the target weight value combination in a case that the first difference value is greater than or equal to the second difference value.

In this embodiment, in a case that the first difference value is less than the second difference value, indicating that the motion mode of the boundary pixel points tends more toward the first block, the third prediction value for the boundary pixel points is determined as the target prediction value.

In a case that the first difference value is greater than or equal to the second difference value, a preset ninth weight value combination can be determined as the target weight value combination.

Optionally, taking the second pixel region being adjacent to the top boundary of the first block and the first block being a luminance block as an example, in a case that the second pixel region of the first block includes 4 rows, with each row including 8 pixels, the above ninth weight value combination can be the same as the above fifth weight value combination.

Optionally, taking the second pixel region being adjacent to the top boundary of the first block and the first block being a chrominance block as an example, in a case that the second pixel region of the first block consists of 1 row including 4 pixels, the above ninth weight value combination can be the same as the above sixth weight value combination.

It should be understood that the above is only for the need to elaborate the technical solution in detail, and the ninth weight value combination is given as an example, and the numerical values included in the ninth weight value combination are not limited herein.

In this embodiment, different weight value combinations are determined based on the magnitude relationship between the first difference value and the second difference value, where the above magnitude relationship can reflect the motion differences between the first and second blocks. Therefore, this has the motion differences between the first and second blocks fully considered in the process of using the weight value combination to correct the prediction values of the boundary pixel points, improving the accuracy of the corrected prediction values of the boundary pixel points, and thereby improving the efficiency of video encoding and decoding.

Optionally, the determining a target weight value combination based on the target information includes:
- determining the third prediction value for each pixel point in the second pixel region as the target prediction value in a case that the first difference value is less than the second difference value; and
- determining the target weight value combination based on the first difference value and the second difference value in a case that the first difference value is greater than or equal to the second difference value.

In this embodiment, in a case that the first difference value is less than the second difference value, indicating that the motion mode of the boundary pixel points tends more toward the first block, the third prediction value for the boundary pixel points is determined as the target prediction value.

In a case that the first difference value is greater than or equal to the second difference value, the target weight value combination can be determined based on the first difference value and the second difference value. For specific technical solutions on how the target weight value combination is determined based on the first difference value and the second difference value, refer to subsequent embodiments.

In this embodiment, different weight value combinations are determined based on the magnitude relationship between the first difference value and the second difference value, where the above magnitude relationship can reflect the motion differences between the first and second blocks. Therefore, this has the motion differences between the first and second blocks fully considered in the process of using the weight value combination to correct the prediction values of the boundary pixel points, improving the accuracy of the corrected prediction values of the boundary pixel points, and thereby improving the efficiency of video encoding and decoding.

Optionally, the determining the target weight value combination based on the first difference value and the second difference value includes:
- determining a tenth weight value combination as the target weight value combination in a case that the calculation result between the first difference value and the second difference value is less than or equal to a first threshold, the first threshold being a non-negative number; and
- determining an eleventh weight value combination as the target weight value combination in a case that the calculation result between the first difference value and the second difference value is greater than the first threshold.

In this embodiment, a preset calculation formula is used for performing a calculation on the first difference value and the second difference value to obtain a calculation result, which is also referred to as a relationship parameter, and the calculation result is used to represent the difference between the first difference value and the second difference value. In this embodiment, a first threshold is also preset, which is a non-negative number, optionally, the first threshold is 0. In a case that the calculation result is less than or equal to the first threshold, a preset tenth weight value combination can be determined as the target weight value combination.

Optionally, taking the second pixel region being adjacent to the top boundary of the first block and the first block being a luminance block as an example, in a case that the second pixel region of the first block includes 4 rows, with each row including 8 pixels, the above tenth weight value combination can be the same as the above fifth weight value combination.

Optionally, taking the second pixel region being adjacent to the top boundary of the first block and the first block being a chrominance block as an example, in a case that the second pixel region of the first block consists of 1 row including 4 pixels, the above tenth weight value combination can be:

$w10_{1,0}=7$, $w10_{2,0}=1$

It should be understood that the above is only for the need to elaborate the technical solution in detail, and the tenth weight value combination is given as an example, and the numerical values included in the tenth weight value combination are not limited herein.

In a case that the calculation result is greater than the first threshold, a preset eleventh weight value combination can be determined as the target weight value combination.

Optionally, taking the second pixel region being adjacent to the top boundary of the first block and the first block being a luminance block as an example, in a case that the second pixel region of the first block includes 4 rows, with each row including 8 pixels, the above eleventh weight value combination can be the same as the above seventh weight value combination.

Optionally, taking the second pixel region being adjacent to the top boundary of the first block and the first block being a chrominance block as an example, in a case that the second pixel region of the first block consists of 1 row including 4 pixels, the above eleventh weight value combination can be the same as the above eighth weight value combination.

It should be understood that the above is only for the need to elaborate the technical solution in detail, and the eleventh weight value combination is given as an example, and the numerical values included in the eleventh weight value combination are not limited herein.

Optionally, the determining a target weight value combination based on the target information includes:
  determining the third prediction value for each pixel point in the second pixel region as the target prediction value in a case that the first difference value is less than the second difference value;
  determining a ninth weight value combination as the target weight value combination in a case that the first difference value is equal to the second difference value; and
  determining the target weight value combination based on the first difference value and the second difference value in a case that the first difference value is greater than the second difference value.

In this embodiment, in a case that the first difference value is less than the second difference value, indicating that the motion mode of the boundary pixel points tends more toward the first block, the third prediction value for the boundary pixel points is determined as the target prediction value.

In a case that the first difference value is equal to the second difference value, a preset ninth weight value combination can be determined as the target weight value combination. In a case that the first difference value is greater than the second difference value, the target weight value combination can be determined based on the first difference value and the second difference value.

In this embodiment, different weight value combinations are determined based on the magnitude relationship between the first difference value and the second difference value, where the above magnitude relationship can reflect the motion differences between the first and second blocks. Therefore, this has the motion differences between the first and second blocks fully considered in the process of using the weight value combination to correct the prediction values of the boundary pixel points, improving the accuracy of the corrected prediction values of the boundary pixel points, and thereby improving the efficiency of video encoding and decoding.

Optionally, the determining the target weight value combination based on the first difference value and the second difference value includes:
  determining a tenth weight value combination as the target weight value combination in a case that the calculation result between the first difference value and the second difference value is less than a second threshold; and
  determining an eleventh weight value combination as the target weight value combination in a case that the calculation result between the first difference value and the second difference value is greater than or equal to the second threshold.

In this embodiment, a preset calculation formula is used for performing a calculation on the first difference value and the second difference value to obtain a calculation result, which is also referred to as a relationship parameter. In this embodiment, a second threshold is also preset, which can be the same as the first threshold. In a case that the calculation result is less than the second threshold, a preset tenth weight value combination can be determined as the target weight value combination. As mentioned above, in a case that the first block is a luminance block, the above tenth weight value combination can be the same as the fifth weight value combination.

In a case that the calculation result is greater than or equal to the second threshold, a preset eleventh weight value combination can be determined as the target weight value combination. As mentioned above, in a case that the first block is a luminance block, the above eleventh weight value combination can be the same as the seventh weight value combination; in a case that the first block is a chrominance block, the above eleventh weight value combination can be the same as the eighth weight value combination.

Optionally, the determining a target weight value combination based on the target information includes:
  performing calculation on the first difference value and the second difference value according to a preset calculation formula to obtain a calculation result; and
  determining the target weight value combination based on the calculation result.

In this embodiment, the first difference value and the second difference value can be calculated according to a preset calculation formula to obtain a calculation result. The above calculation formula can be subtraction or division operations, that is, the calculation result can be the result of subtraction between the first difference value and the second difference value, or the result of division between the first difference value and the second difference value, or another type of calculation method, which is not specifically limited in this embodiment.

After the calculation result is obtained, the target weight value combination is determined based on that calculation result.

In this embodiment, different weight value combinations are determined based on the calculation result between the first difference value and the second difference value, where the above magnitude relationship can reflect the motion differences between the first and second blocks. Therefore, this has the motion differences between the first and second blocks fully considered in the process of using the weight value combination to correct the prediction values of the boundary pixel points, improving the accuracy of the corrected prediction values of the boundary pixel points, and thereby improving the efficiency of video encoding and decoding.

Optionally, the determining the target weight value combination based on the calculation result includes:
  determining the third prediction value for each pixel point in the second pixel region as the target prediction value in a case that the calculation result is less than or equal to a third threshold;

determining a ninth weight value combination as the target weight value combination in a case that the calculation result is greater than or equal to a fourth threshold;
determining a tenth weight value combination as the target weight value combination in a case that the calculation result is greater than the third threshold and less than or equal to a fifth threshold; and
determining an eleventh weight value combination as the target weight value combination in a case that the calculation result is greater than the fifth threshold and less than the fourth threshold.

In this embodiment, a third threshold, a fourth threshold, and a fifth threshold are preset, all of which are non-negative numbers, and the third threshold is less than the fifth threshold, and the fifth threshold is less than the fourth threshold.

In a case that the calculation result is less than or equal to the third threshold, the third prediction value for the boundary pixel points is determined as the target prediction value.

In a case that the calculation result is greater than or equal to the fourth threshold, a preset ninth weight value combination is determined as the target weight value combination. As mentioned above, in a case that the first block is a luminance block, the above ninth weight value combination can be the same as the above fifth weight value combination; in a case that the first block is a chrominance block, the above ninth weight value combination can be the same as the above sixth weight value combination.

In a case that the calculation result is greater than the third threshold and less than or equal to the fifth threshold, a preset tenth weight value combination is determined as the target weight value combination. As mentioned above, in a case that the first block is a luminance block, the above tenth weight value combination can be the same as the above fifth weight value combination.

In a case that the calculation result is greater than the fifth threshold and less than the fourth threshold, a preset eleventh weight value combination is determined as the target weight value combination. As mentioned above, in a case that the first block is a luminance block, the above eleventh weight value combination can be the same as the seventh weight value combination; in a case that the first block is a chrominance block, the above eleventh weight value combination can be the same as the eighth weight value combination.

The inter-frame prediction method provided in the embodiments of this application can be executed by an inter-frame prediction apparatus. In the embodiments of this application, the inter-frame prediction apparatus performing the inter-frame prediction method is used as an example to describe the inter-frame prediction apparatus provided in the embodiments of this application.

Figure 10:
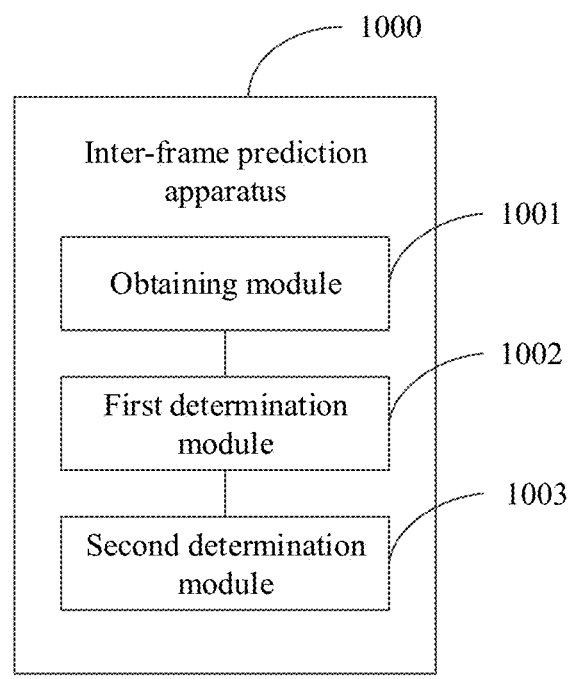
FIG. 10 is a structural diagram of an inter-frame prediction apparatus according to an embodiment of this application.

As shown in FIG. 10, the inter-frame prediction apparatus 1000 includes:
an obtaining module 1001 configured to obtain first motion information of a first block and second motion information of a second block;
a first determination module 1002 configured to determine first and second prediction values corresponding to each pixel point in a first pixel region associated with the first block; and
a second determination module 1003 configured to determine a target prediction value corresponding to each pixel point in a second pixel region of the first block based on target information.

Optionally, the second determination module 1003 includes:
a determination unit configured to determine a target weight value combination based on the target information; and
a processing unit configured to perform weighted sum processing on the third and fourth prediction values corresponding to each pixel point in the second pixel region based on the target weight value combination to obtain the target prediction value corresponding to each pixel point in the second pixel region.

Optionally, the determination unit is specifically configured to:
determine a first weight value combination as the target weight value combination in a case that the first difference value is greater than the second difference value and/or the third difference value;
in a case that the third difference value is less than the first difference value and the second difference value, determine a second weight value combination as the target weight value combination, or determine the target weight value combination based on the first difference value and the second difference value;
determine the third prediction value for each pixel point in the second pixel region as the target prediction value in a case that the first difference value is less than the second difference value and the third difference value; or
determine the fourth prediction value for each pixel point in the second pixel region as the target prediction value in a case that the second difference value is less than the third difference value and the first difference value.

Optionally, the determination unit is further specifically configured to:
determine a third weight value combination as the target weight value combination in a case that the third difference value is less than the first difference value and the second difference value and that the first difference value is less than the second difference value; and
determine a fourth weight value combination as the target weight value combination in a case that the third difference value is less than the first difference value and the second difference value and that the first difference value is greater than or equal to the second difference value.

Optionally, the determination unit is further specifically configured to:
determine a fifth weight value combination as the target weight value combination in a case that the type of the first block is a luminance block and that the first difference value is greater than the second difference value and/or the third difference value;
determine a sixth weight value combination as the target weight value combination in a case that the type of the first block is a chrominance block and that the first difference value is greater than the second difference value and/or the third difference value;
determine a seventh weight value combination as the target weight value combination in a case that the type of the first block is a luminance block and that the third difference value is less than the first difference value and the second difference value; and
determine an eighth weight value combination as the target weight value combination in a case that the type of the first block is a chrominance block and that the third difference value is less than the first difference value and the second difference value.

Optionally, the inter-frame prediction apparatus 1000 further includes a third determination module, and the third determination module is configured to:

perform weighted sum processing on the first and second prediction values corresponding to each pixel point in the first pixel region to obtain a fifth prediction value for each pixel point; and determine the third difference value corresponding to the first pixel region based on the fifth prediction value for each pixel point and the reconstructed value corresponding to each pixel point.

Optionally, the third determination module is further specifically configured to:

determine a sum of target absolute values corresponding to all pixel points in the first pixel region as the third difference value;

determine an average of the target absolute values corresponding to all pixel points in the first pixel region as the third difference value.

Optionally, the determination unit is further specifically configured to:

determine the third prediction value for each pixel point in the second pixel region as the target prediction value in a case that the first difference value is less than the second difference value;

determine a ninth weight value combination as the target weight value combination in a case that the first difference value is greater than or equal to the second difference value.

Optionally, the determination unit is further specifically configured to:

determine the third prediction value for each pixel point in the second pixel region as the target prediction value in a case that the first difference value is less than the second difference value;

determine the target weight value combination based on the first difference value and the second difference value in a case that the first difference value is greater than or equal to the second difference value.

Optionally, the determination unit is further specifically configured to:

determine a tenth weight value combination as the target weight value combination in a case that the calculation result between the first difference value and the second difference value is less than or equal to a first threshold; and determine an eleventh weight value combination as the target weight value combination in a case that the calculation result between the first difference value and the second difference value is greater than the first threshold.

Optionally, the determination unit is further specifically configured to:

determine the third prediction value for each pixel point in the second pixel region as the target prediction value in a case that the first difference value is less than the second difference value;

determine a ninth weight value combination as the target weight value combination in a case that the first difference value is equal to the second difference value; and determine the target weight value combination based on the first difference value and the second difference value in a case that the first difference value is greater than the second difference value.

Optionally, the determination unit is further specifically configured to:

determine a tenth weight value combination as the target weight value combination in a case that the calculation result between the first difference value and the second difference value is less than a second threshold; and determine an eleventh weight value combination as the target weight value combination in a case that the calculation result between the first difference value and the second difference value is greater than or equal to the second threshold.

Optionally, the determination unit is further specifically configured to:

perform calculation on the first difference value and the second difference value according to a preset calculation formula to obtain a calculation result; and determine the target weight value combination based on the calculation result.

Optionally, the determination unit is further specifically configured to:

determine the third prediction value for each pixel point in the second pixel region as the target prediction value in a case that the calculation result is less than or equal to a third threshold;

determine a ninth weight value combination as the target weight value combination in a case that the calculation result is greater than or equal to a fourth threshold;

determine a tenth weight value combination as the target weight value combination in a case that the calculation result is greater than the third threshold and less than or equal to a fifth threshold; and determine an eleventh weight value combination as the target weight value combination in a case that the calculation result is greater than the fifth threshold and less than the fourth threshold.

In the embodiments of this application, first and second prediction values are determined, where the first prediction value is determined based on first motion information of a first block, and the second prediction value is determined based on second motion information of a second block; and then, target prediction values for boundary pixel points are determined based on target information. The target information includes first and second difference values, and a magnitude relationship between the first and second difference values can represent a motion difference between the first and second blocks, thus fully considering the motion difference between the first and second blocks in the process of correcting the prediction values for the boundary pixel points, improving the accuracy of the corrected prediction values for the boundary pixel points, and thereby improving the efficiency of video encoding and decoding.

The inter-frame prediction apparatus according to the embodiments of this application is capable of implementing all the processes realized by the method embodiment of FIG. 3 and achieving the same technical effects. To avoid repetition, details are not described herein again.

The inter-frame prediction apparatus in the embodiments of this application may be an electronic device, for example an electronic device having an operating system, or may be a component of an electronic device, for example, an integrated circuit or a chip. The electronic device may be a terminal or a device other than terminals. For example, the terminal may include but is not limited to the types of the terminal listed above, and the other devices may be servers, network attached storage (NAS), or the like, which are not specifically limited in the embodiments of this application.

Figure 11:
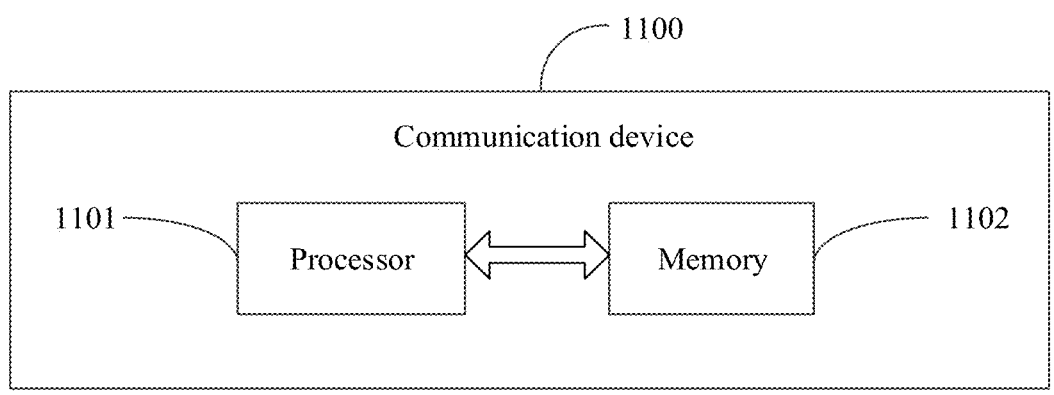
FIG. 11 is a structural diagram of a communication device according to an embodiment of this application.

Optionally, as shown in FIG. 11, an embodiment of this application further provides a communication device 1100 including a processor 1101 and a memory 1102, where the memory 1102 stores a program or instructions capable of running on the processor 1101. For example, in a case that the communication device 1100 is a terminal, and when the program or instructions are executed by the processor 1101, the steps of the foregoing embodiment of the inter-frame prediction method are implemented, with the same technical effects achieved.

An embodiment of this application further provides a terminal, including a processor and a communication interface. The processor is configured to execute the following operations:

obtaining first motion information of a first block and second motion information of a second block;

determining first and second prediction values corresponding to each pixel point in a first pixel region associated with the first block; and determining a target prediction value corresponding to each pixel point in a second pixel region of the first block based on target information.

Figure 12:
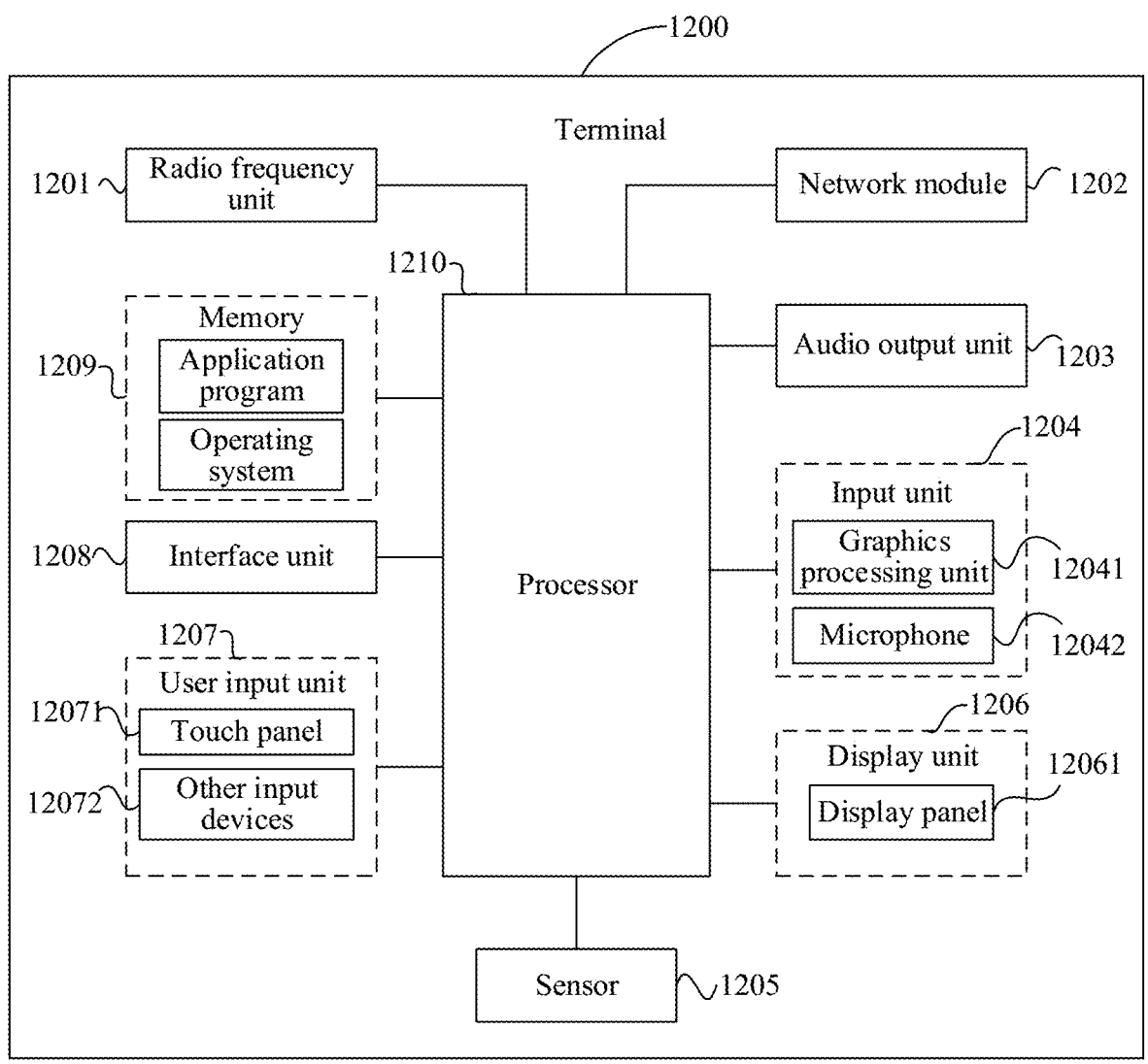
FIG. 12 is a schematic diagram of a hardware structure of a terminal according to an embodiment of this application.

This terminal embodiment corresponds to the foregoing method embodiment on the terminal side. All processes and implementations in the foregoing method embodiment can be applicable to this terminal embodiment, with the same technical effects achieved. Specifically, FIG. 12 is a schematic diagram of a hardware structure of a terminal implementing the embodiments of this application.

The terminal 1200 includes but is not limited to components such as a radio frequency unit 1201, a network module 1202, an audio output unit 1203, an input unit 1204, a sensor 1205, a display unit 1206, a user input unit 1207, an interface unit 1208, a memory 1209, and a processor 1210.

It can be understood by those skilled in the art that the terminal 1200 may further include a power supply (for example, a battery) supplying power to the components. The power supply may be logically connected to the processor 1210 via a power management system, so that functions such as charge management, discharge management, and power consumption management are implemented by using the power management system. The structure of the terminal shown in FIG. 12 does not constitute a limitation on the terminal. The terminal may include more or fewer components than illustrated in the figure, or combine some components, or have a different component arrangement. Details are not described herein.

It should be understood that in an embodiment of this application, the input unit 1204 may include a graphics processing unit (GPU) 12041 and a microphone 12042. The graphics processing unit 12041 processes picture data of a static picture or a video obtained by a picture capture apparatus (such as a camera) in a video capture mode or a picture capture mode. The display unit 1206 may include a display panel 12061. The display panel 12061 may be configured in a form of a liquid crystal display, an organic light-emitting diode display, or the like. The user input unit 1207 includes at least one of a touch panel 12071 and other input devices 12072. The touch panel 12071 is also referred to as a touchscreen. The touch panel 12071 may include two parts: a touch detection apparatus and a touch controller. The other input devices 12072 may include but are not limited to a physical keyboard, a function button (such as a volume control button or a power button), a trackball, a mouse, and a joystick. Details are not described now.

In an embodiment of this application, the radio frequency unit 1201 receives downlink data from a network-side device and transfers the data to the processor 1210 for processing; and the radio frequency unit 1201 can additionally send uplink data to the network-side device. Generally, the radio frequency unit 1201 includes but is not limited to an antenna, an amplifier, a transceiver, a coupler, a low noise amplifier, a duplexer, and the like.

The memory 1209 may be configured to store software programs or instructions and various data. The memory 1209 may mainly include a first storage region storing a program or instructions and a second storage region storage data. The first storage region may store an operating system, an application program or instructions required by at least one function (for example, sound play function or picture play function), and the like. The memory 1209 may include a volatile memory or a non-volatile memory, or may include a volatile memory and a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (SRAM), a static RAM (SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDRSDRAM), an enhanced synchronous dynamic random access memory (Enhanced SDRAM, ESDRAM), a synchronous link dynamic random access memory (Synch link DRAM, SLDRAM), and a direct rambus random access memory (Direct Rambus RAM, DRRAM). The memory 1209 described in the embodiments of this application is intended to include but is not limited to these and any other suitable types of memories.

The processor 1210 may include one or more processing units. Optionally, the processor 1210 may integrate an application processor and a modem processor. The application processor primarily processes operations involving an operating system, user interface, application program, or the like. The modem processor primarily processes radio communication signals, for example, being a baseband processor. It can be understood that a modem processor may alternatively skip being integrated in the processor 1210.

The processor 1210 is configured to:

obtain first motion information of a first block and second motion information of a second block;

determine first and second prediction values corresponding to each pixel point in a first pixel region associated with the first block; and determine a target prediction value corresponding to each pixel point in a second pixel region of the first block based on target information.

In the embodiments of this application, first and second prediction values are determined, where the first prediction value is determined based on first motion information of a first block, and the second prediction value is determined based on second motion information of a second block; and then, target prediction values for boundary pixel points are determined based on target information. The target information includes first and second difference values, and a magnitude relationship between the first and second difference values can represent a motion difference between the first and second blocks, thus fully considering the motion difference between the first and second blocks in the process of correcting the prediction values for the boundary pixel points, improving the accuracy of the corrected prediction values for the boundary pixel points, and thereby improving the efficiency of video encoding and decoding.

An embodiment of this application also provides a readable storage medium having a program or instructions stored thereon. When the program or instructions are executed by the processor, the processes in the foregoing inter-frame prediction method embodiment are implemented with the same technical effects achieved. To avoid repetition, details are not described herein again.

The processor is a processor in the terminal described in the foregoing embodiment. The readable storage medium includes a computer-readable storage medium such as a computer read-only memory ROM, a random access memory RAM, a magnetic disk, or an optical disc.

An embodiment of this application also provides a chip including a processor and a communication interface. The communication interface is coupled with the processor, and the processor is configured to execute the program or instructions to implement the processes in the foregoing inter-frame prediction method embodiment with the same technical effects achieved. To avoid repetition, details are not described herein again.

It should be understood that the chip mentioned in an embodiment of this application may also be referred to as a system-level chip, a system chip, a chip system, a system-on-chip, or the like.

An embodiment of this application further provides a computer program/program product, where the computer program/program product is stored in a readable storage medium, and the computer program/program product is executed by at least one processor to implement the processes of the foregoing inter-frame prediction method embodiments, with the same technical effects achieved. To avoid repetition, details are not described herein again.

It should be noted that in this specification, the terms "include" and "include", or any of their variants are intended to cover a non-exclusive inclusion, such that a process, method, article, or apparatus that includes a series of elements includes not only those elements but also other elements that are not expressly listed, or further includes elements inherent to such process, method, article, or apparatus. Without more restrictions, an element preceded by the statement "includes a . . . " does not preclude the presence of other identical elements in the process, method, article, or apparatus that includes the element. Furthermore, it should be noted that the scope of the method and apparatus in the embodiments of this application is not limited to performing the functions in the order shown or discussed, but may also include performing the functions in a substantially simultaneous manner or in a reverse order depending on the functions involved. For example, the described method may be performed in an order different from the order described, and steps may be added, omitted, or combined. In addition, features described with reference to some examples may be combined in other examples.

Based on the above description of embodiments, persons skilled in the art can clearly understand that the method in the foregoing embodiments can be implemented through software on a necessary hardware platform or certainly through hardware only, but in many cases, the former is the more preferred implementation. Based on such an understanding, the technical solutions of this application essentially, or the part contributing to the prior art may be implemented in a form of a computer software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. An inter-frame prediction method, wherein the method comprises:
   obtaining first motion information of a first block and second motion information of a second block, wherein the first block is adjacent to the second block;
   determining first and second prediction values corresponding to each pixel point in a first pixel region associated with the first block, wherein the first prediction value is determined based on the first motion information and position information of the first pixel region, and the second prediction value is determined based on the second motion information and position information of the first pixel region; and
   determining a target prediction value corresponding to each pixel point in a second pixel region of the first block based on target information, wherein the target information comprises a first difference value and a second difference value, the first difference value being a difference value determined based on a reconstructed value and the first prediction value for each pixel point in the first pixel region, and the second difference value being a difference value determined based on a reconstructed value and the second prediction value for each pixel point in the first pixel region; wherein
   the first block is a block to be encoded, and the second block is an encoded block; or the first block is a block to be decoded, and the second block is a decoded block.

2. The method of claim 1, wherein the target information further comprises a third difference value, the third difference value being a difference value, corresponding to the first pixel region, determined based on the first and the second prediction values.

3. The method according to claim 1, wherein the first pixel region satisfies at least one of the following:
   the first pixel region is a pixel region encoded or decoded consisting of M1 rows and N1 columns adjacent to the top of the first block; and
   the first pixel region is a pixel region encoded or decoded consisting of M2 rows and N2 columns adjacent to the left of the first block; wherein
   M1, M2, N1, and N2 are all positive integers.

4. The method according to claim 1, wherein the determining a target prediction value corresponding to each pixel point in a second pixel region of the first block based on target information comprises:
   determining a target weight value combination based on the target information, wherein the target weight value combination comprises at least one weight group, the weight group comprises a first weight value and a second weight value, the first weight value corresponds to a third prediction value for each pixel point in the second pixel region, the second weight value corresponds to a fourth prediction value for each pixel point in the second pixel region, the third prediction value is determined based on the first motion information, and the fourth prediction value is determined based on the second motion information; and performing weighted sum processing on the third and fourth prediction values corresponding to each pixel point in the second pixel region based on the target weight value combination to obtain the target prediction value corresponding to each pixel point in the second pixel region.

5. The method according to claim 4, wherein the determining a target weight value combination based on the target information comprises:

determining a first weight value combination as the target weight value combination in a case that the first difference value is greater than the second difference value and/or the third difference value;

in a case that the third difference value is less than the first difference value and the second difference value, determining a second weight value combination as the target weight value combination, or determining the target weight value combination based on the first difference value and the second difference value;

determining the third prediction value for each pixel point in the second pixel region as the target prediction value in a case that the first difference value is less than the second difference value and the third difference value; or determining the fourth prediction value for each pixel point in the second pixel region as the target prediction value in a case that the second difference value is less than the third difference value and the first difference value.

6. The method according to claim 4, wherein the target information further comprises a type of the first block, and the determining a target weight value combination based on the target information comprises:

determining a fifth weight value combination as the target weight value combination in a case that the type of the first block is a luminance block and that the first difference value is greater than the second difference value and/or the third difference value;

determining a sixth weight value combination as the target weight value combination in a case that the type of the first block is a chrominance block and that the first difference value is greater than the second difference value and/or the third difference value;

determining a seventh weight value combination as the target weight value combination in a case that the type of the first block is a luminance block and that the third difference value is less than the first difference value and the second difference value; and determining an eighth weight value combination as the target weight value combination in a case that the type of the first block is a chrominance block and that the third difference value is less than the first difference value and the second difference value.

7. The method according to claim 2, wherein the method further comprises:

performing weighted sum processing on the first and second prediction values corresponding to each pixel point in the first pixel region to obtain a fifth prediction value for each pixel point; and determining the third difference value corresponding to the first pixel region based on the fifth prediction value for each pixel point and the reconstructed value corresponding to each pixel point.

8. A terminal, comprising a processor and a memory, wherein the memory stores a program or instructions capable of running on the processor, and when the program or instructions are executed by the processor, implementing:

obtaining first motion information of a first block and second motion information of a second block, wherein the first block is adjacent to the second block;

determining first and second prediction values corresponding to each pixel point in a first pixel region associated with the first block, wherein the first prediction value is determined based on the first motion information and position information of the first pixel region, and the second prediction value is determined based on the second motion information and position information of the first pixel region; and determining a target prediction value corresponding to each pixel point in a second pixel region of the first block based on target information, wherein the target information comprises a first difference value and a second difference value, the first difference value being a difference value determined based on a reconstructed value and the first prediction value for each pixel point in the first pixel region, and the second difference value being a difference value determined based on a reconstructed value and the second prediction value for each pixel point in the first pixel region; wherein the first block is a block to be encoded, and the second block is an encoded block; or the first block is a block to be decoded, and the second block is a decoded block.

9. The terminal of claim 8, wherein the target information further comprises a third difference value, the third difference value being a difference value, corresponding to the first pixel region, determined based on the first and the second prediction values.

10. The terminal according to claim 8, wherein the first pixel region satisfies at least one of the following:

the first pixel region is a pixel region encoded or decoded consisting of M1 rows and N1 columns adjacent to the top of the first block; and the first pixel region is a pixel region encoded or decoded consisting of M2 rows and N2 columns adjacent to the left of the first block; wherein M1, M2, N1, and N2 are all positive integers.

11. The terminal according to claim 8, wherein the determining a target prediction value corresponding to each pixel point in a second pixel region of the first block based on target information comprises:

determining a target weight value combination based on the target information, wherein the target weight value combination comprises at least one weight group, the weight group comprises a first weight value and a second weight value, the first weight value corresponds to a third prediction value for each pixel point in the second pixel region, the second weight value corresponds to a fourth prediction value for each pixel point in the second pixel region, the third prediction value is determined based on the first motion information, and the fourth prediction value is determined based on the second motion information; and performing weighted sum processing on the third and fourth prediction values corresponding to each pixel point in the second pixel region based on the target weight value combination to obtain the target prediction value corresponding to each pixel point in the second pixel region.

12. The terminal according to claim 11, wherein the determining a target weight value combination based on the target information comprises:
  determining a first weight value combination as the target weight value combination in a case that the first difference value is greater than the second difference value and/or the third difference value;
  in a case that the third difference value is less than the first difference value and the second difference value, determining a second weight value combination as the target weight value combination, or determining the target weight value combination based on the first difference value and the second difference value;
  determining the third prediction value for each pixel point in the second pixel region as the target prediction value in a case that the first difference value is less than the second difference value and the third difference value; or
  determining the fourth prediction value for each pixel point in the second pixel region as the target prediction value in a case that the second difference value is less than the third difference value and the first difference value.

13. The terminal according to claim 11, wherein the target information further comprises a type of the first block, and the determining a target weight value combination based on the target information comprises:
  determining a fifth weight value combination as the target weight value combination in a case that the type of the first block is a luminance block and that the first difference value is greater than the second difference value and/or the third difference value;
  determining a sixth weight value combination as the target weight value combination in a case that the type of the first block is a chrominance block and that the first difference value is greater than the second difference value and/or the third difference value;
  determining a seventh weight value combination as the target weight value combination in a case that the type of the first block is a luminance block and that the third difference value is less than the first difference value and the second difference value; and
  determining an eighth weight value combination as the target weight value combination in a case that the type of the first block is a chrominance block and that the third difference value is less than the first difference value and the second difference value.

14. The terminal according to claim 9, wherein the method further comprises:
  performing weighted sum processing on the first and second prediction values corresponding to each pixel point in the first pixel region to obtain a fifth prediction value for each pixel point; and
  determining the third difference value corresponding to the first pixel region based on the fifth prediction value for each pixel point and the reconstructed value corresponding to each pixel point.

15. A non-transitory readable storage medium, wherein the readable storage medium stores a program or instructions, and when the program or the instructions are executed by a processor, implementing:
  obtaining first motion information of a first block and second motion information of a second block, wherein the first block is adjacent to the second block;
  determining first and second prediction values corresponding to each pixel point in a first pixel region associated with the first block, wherein the first prediction value is determined based on the first motion information and position information of the first pixel region, and the second prediction value is determined based on the second motion information and position information of the first pixel region; and
  determining a target prediction value corresponding to each pixel point in a second pixel region of the first block based on target information, wherein the target information comprises a first difference value and a second difference value, the first difference value being a difference value determined based on a reconstructed value and the first prediction value for each pixel point in the first pixel region, and the second difference value being a difference value determined based on a reconstructed value and the second prediction value for each pixel point in the first pixel region; wherein
  the first block is a block to be encoded, and the second block is an encoded block;
  or the first block is a block to be decoded, and the second block is a decoded block.

16. The non-transitory readable storage medium of claim 15, wherein the target information further comprises a third difference value, the third difference value being a difference value, corresponding to the first pixel region, determined based on the first and the second prediction values.

17. The non-transitory readable storage medium according to claim 15, wherein the first pixel region satisfies at least one of the following:
  the first pixel region is a pixel region encoded or decoded consisting of M1 rows and N1 columns adjacent to the top of the first block; and
  the first pixel region is a pixel region encoded or decoded consisting of M2 rows and N2 columns adjacent to the left of the first block; wherein
  M1, M2, N1, and N2 are all positive integers.

18. The non-transitory readable storage medium according to claim 15, wherein the determining a target prediction value corresponding to each pixel point in a second pixel region of the first t block based on target information comprises:
  determining a target weight value combination based on the target information, wherein the target weight value combination comprises at least one weight group, the weight group comprises a first weight value and a second weight value, the first weight value corresponds to a third prediction value for each pixel point in the second pixel region, the second weight value corresponds to a fourth prediction value for each pixel point in the second pixel region, the third prediction value is determined based on the first motion information, and the fourth prediction value is determined based on the second motion information; and
  performing weighted sum processing on the third and fourth prediction values corresponding to each pixel point in the second pixel region based on the target weight value combination to obtain the target prediction value corresponding to each pixel point in the second pixel region.

19. The non-transitory readable storage medium according to claim 18, wherein the determining a target weight value combination based on the target information comprises:
  determining a first weight value combination as the target weight value combination in a case that the first difference value is greater than the second difference value and/or the third difference value;

in a case that the third difference value is less than the first difference value and the second difference value, determining a second weight value combination as the target weight value combination, or determining the target weight value combination based on the first difference value and the second difference value;

determining the third prediction value for each pixel point in the second pixel region as the target prediction value in a case that the first difference value is less than the second difference value and the third difference value; or determining the fourth prediction value for each pixel point in the second pixel region as the target prediction value in a case that the second difference value is less than the third difference value and the first difference value.

20. The non-transitory readable storage medium according to claim 18, wherein the target information further comprises a type of the first block, and the determining a target weight value combination based on the target information comprises:

determining a fifth weight value combination as the target weight value combination in a case that the type of the first block is a luminance block and that the first difference value is greater than the second difference value and/or the third difference value;

determining a sixth weight value combination as the target weight value combination in a case that the type of the first block is a chrominance block and that the first difference value is greater than the second difference value and/or the third difference value;

determining a seventh weight value combination as the target weight value combination in a case that the type of the first block is a luminance block and that the third difference value is less than the first difference value and the second difference value; and determining an eighth weight value combination as the target weight value combination in a case that the type of the first block is a chrominance block and that the third difference value is less than the first difference value and the second difference value.

* * * * *